(12) United States Patent
Wu et al.

(10) Patent No.: US 11,610,514 B1
(45) Date of Patent: Mar. 21, 2023

(54) ARM FOR CRASH DUMMY, CONTROL METHOD, DEVICE AND STORAGE MEDIUM

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Wu, Tianjin (CN); Zhixin Liu, Tianjin (CN); Kai Wang, Tianjin (CN); Weidong Liu, Tianjin (CN); Hong Chen, Tianjin (CN); Yongqiang Wu, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 17/936,387

(22) Filed: Sep. 29, 2022

(51) Int. Cl.
*G09B 23/32* (2006.01)
*G01M 7/08* (2006.01)
*G01M 17/007* (2006.01)
*B25J 9/10* (2006.01)
*B25J 18/00* (2006.01)

(52) U.S. Cl.
CPC .............. *G09B 23/32* (2013.01); *B25J 9/104* (2013.01); *B25J 18/00* (2013.01); *G01M 7/08* (2013.01); *G01M 17/0078* (2013.01)

(58) Field of Classification Search
CPC ... B25J 18/00; B25J 18/02; B25J 18/04; B25J 9/104; G01L 5/0052; G01M 17/0078; G01M 7/08; G09B 23/32
See application file for complete search history.

(56) References Cited

U.S. PATENT DOCUMENTS

| 4,078,670 | A | | 3/1978 | Francois et al. |
| 4,283,165 | A | * | 8/1981 | Vertut ...................... B25J 5/007 414/733 |

(Continued)

FOREIGN PATENT DOCUMENTS

| CN | 206048245 U | 3/2017 |
| CN | 107253182 A | 10/2017 |

(Continued)

*Primary Examiner* — David L Singer
(74) *Attorney, Agent, or Firm* — True Shepherd LLC; Andrew C. Cheng

(57) ABSTRACT

The present invention relates to the field of vehicle safety crash test dummies, and discloses an arm for a crash dummy, a control method, a device and a storage medium. The arm comprises: a first motor (1), a coupling (2), a capstan shaft (3), a first bevel gear (4), a second motor (5), a first capstan (6), a capstan bearing (7), an elbow joint base (8), a forearm (9), a first elbow joint bearing (11), drive lines (13), a second pulley (14), an elbow joint shaft (16), a first fixed sleeve (17), a second fixed sleeve (18), a second elbow joint bearing (20), an elbow joint connection block (22), a power source connection block (24), a second bevel gear (27), two sets of pulleys, a second capstan (28) and a power source bracket (29). The arm provided in this embodiment has an active function.

7 Claims, 7 Drawing Sheets

(56) References Cited

U.S. PATENT DOCUMENTS

| | | |
|---|---|---|
| 2005/0066705 A1 | 3/2005 | Choi |
| 2017/0067547 A1 | 3/2017 | Edsinger et al. |
| 2019/0381963 A1* | 12/2019 | Verschut ............ G01C 21/1654 |
| 2021/0104179 A1 | 4/2021 | Björklund et al. |

FOREIGN PATENT DOCUMENTS

| | | | | |
|---|---|---|---|---|
| CN | 206967474 U | * | 2/2018 | |
| CN | 110595463 A | | 12/2019 | |
| CN | 112082725 A | | 12/2020 | |
| CN | 112454420 A | | 3/2021 | |
| CN | 214293190 U | * | 9/2021 | |
| DE | 102012207567 B4 | * | 2/2015 | ............ G09B 9/006 |

* cited by examiner

ARM FOR CRASH DUMMY, CONTROL METHOD, DEVICE AND STORAGE MEDIUM

CROSS-REFERENCE TO RELATED APPLICATIONS

This application claims priority to Chinese Patent Application No. 202210658826.1 with a filing date of Jun. 13, 2022. The content of the aforementioned application, including any intervening amendments thereto, is incorporated herein by reference.

TECHNICAL FIELD

The present invention relates to the field of vehicle safety crash test dummies, in particular to an arm for a crash dummy, a control method, a device and a storage medium.

DESCRIPTION OF RELATED ART

With the increase in the number of people traveling by vehicle, the number of traffic accidents caused by vehicle crashes is also rising rapidly. In the event of a crash, a passenger protection system inside a vehicle can protect passengers from major injuries to the greatest extent. The vehicle passive safety crash test technology is an important means to test the effectiveness of the passenger protection system inside the vehicle, among which the crash dummy is an important measuring apparatus to measure the test results.

When the vehicle is about to crash, passengers usually have arm defending actions or other arm dodging actions. The arm of the existing crash dummy is not designed with active degree of freedom. During the crash test, the arm randomly stretches with impact inertia, which is different from the postures of passengers in actual crash. Especially considering that the vehicle passive safety test technology combines active safety to conduct active and passive safety test, the non-active arm of the existing crash dummy will cause its posture after crash to be different from the actual posture of a passenger, which affects the test results.

In view of this, the present invention is proposed.

SUMMARY

In order to solve the above technical problems, the present invention provides an arm for a crash dummy, a control method, a device and a storage medium. The arm for the crash dummy has an active function and can imitate the extension and flexion posture of the human arm more accurately.

An embodiment of the present invention provides an arm for a crash dummy, the arm including:
a first motor 1, a coupling 2, a capstan shaft 3, a first bevel gear 4, a second motor 5, a first capstan 6, a capstan bearing 7, an elbow joint base 8, a forearm 9, a hand 10, a first elbow joint bearing 11, a first pulley 12, drive lines 13, a second pulley 14, a third pulley 15, an elbow joint shaft 16, a first fixed sleeve 17, a second fixed sleeve 18, a seventh pulley 19, a second elbow joint bearing 20, a fifth pulley 21, an elbow joint connection block 22, a sixth pulley 23, a power source connection block 24, an eighth pulley 25, a fourth pulley 26, a second bevel gear 27, a second capstan 28 and a power source bracket 29.

An embodiment of the present invention further provides an arm control method for a crash dummy, which is used to control the above-mentioned arm for the crash dummy, the method including:
when a vehicle crash signal control instruction is received, obtaining a real-time rotation angle of the elbow joint of the arm for the crash dummy through an encoder;
determining a target rotation angle of the elbow joint according to vehicle preset information;
determining control parameters according to the real-time rotation angle and the target rotation angle; and
controlling the first motor and the second motor based on the control parameters.

An embodiment of the present invention further provides an electronic device, the electronic device including:
a processor and a memory.

The processor is used to perform the steps of the method according to any embodiment by calling programs or instructions stored in the memory.

An embodiment of the present invention further provides a computer-readable storage medium storing programs or instructions that cause a computer to perform the steps of the method according to any embodiment.

The embodiments of the present invention have the following technical effects.

The arm for the crash dummy has an active function, and can imitate the extension and flexion posture of the human arm more accurately. In the vehicle crash test, relatively real human postures can be simulated by controlling the extension posture of the arm, so as to ensure that the action level of a vehicle passenger protection system can be reflected accurately, improve the effectiveness of the test and provide a reliable support for the design of vehicle passenger protection systems.

BRIEF DESCRIPTION OF THE DRAWINGS

In order to describe the technical solutions in the specific embodiments of the present invention or in the prior art more clearly, the following briefly introduces the accompanying drawings required in the description of the specific embodiments or the prior art. Apparently, the accompanying drawings in the following description show only some embodiments of the present invention, and those of ordinary skill in the art can still derive other drawings from these accompanying drawings without any creative effort.

DESCRIPTION OF THE EMBODIMENTS

In order to make the objectives, technical solutions and advantages of the present invention clearer, the technical solutions of the present invention will be described clearly and completely below. Obviously, the described embodiments are only some, but not all, embodiments of the present invention. Based on the embodiments of the present invention, all other embodiments obtained by those of ordinary skill in the art without any creative effort fall within the protection scope of the present invention.

Aiming at the problem that an arm of a crash dummy cannot simulate the real posture of the human body in a vehicle crash test, an arm for a crash dummy according to an embodiment of the present invention is proposed. The arm is mainly used in the vehicle crash test. The arm has an active function, and can reflect the actual actions of the human arm more really in the event of a crash, so as to reflect the action level of a vehicle passenger protection system and provide a reliable support for the design of vehicle passenger protection systems.

Figure 1:
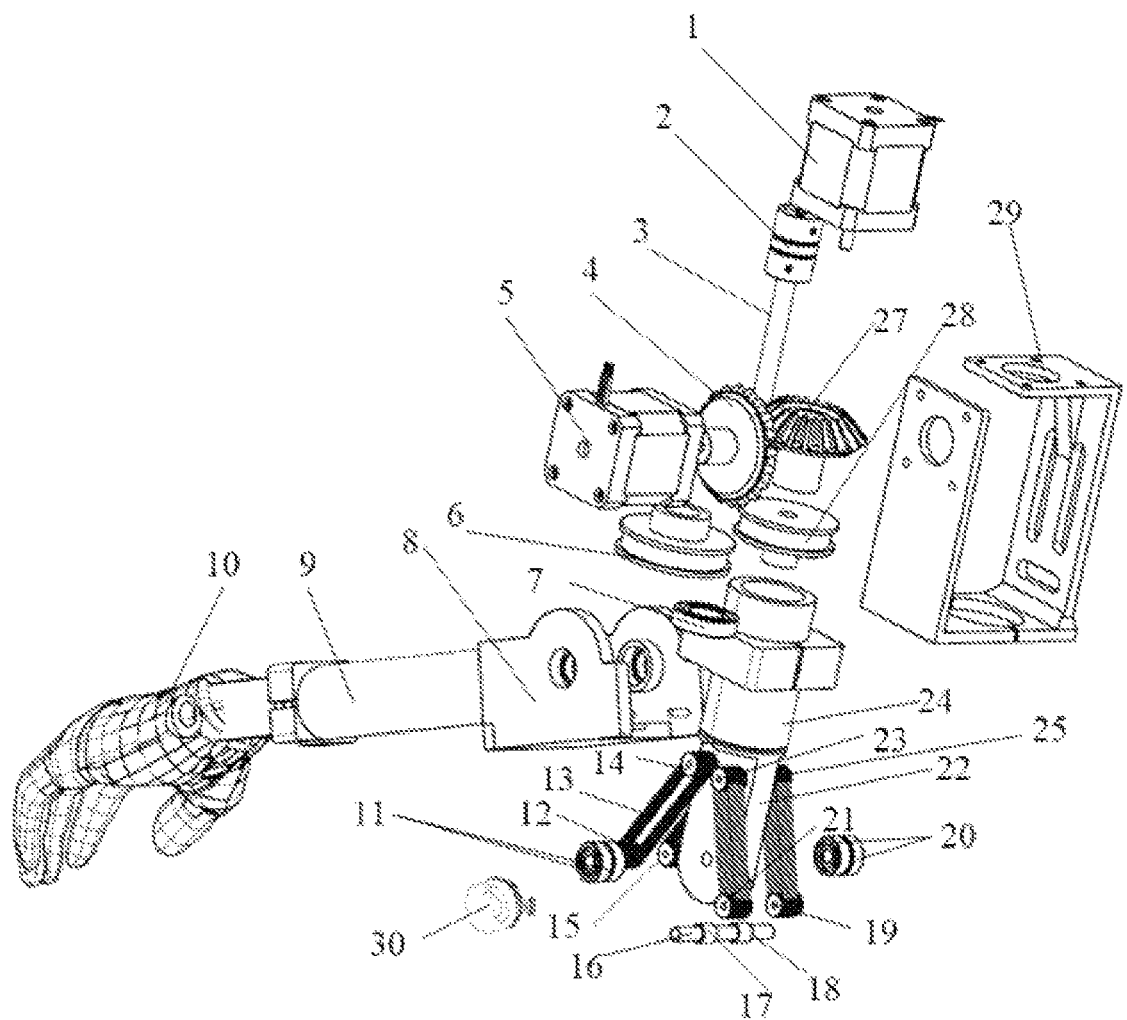
FIG. 1 is a structural exploded view of an arm for a crash dummy according to an embodiment of the present invention.
Figure 2:
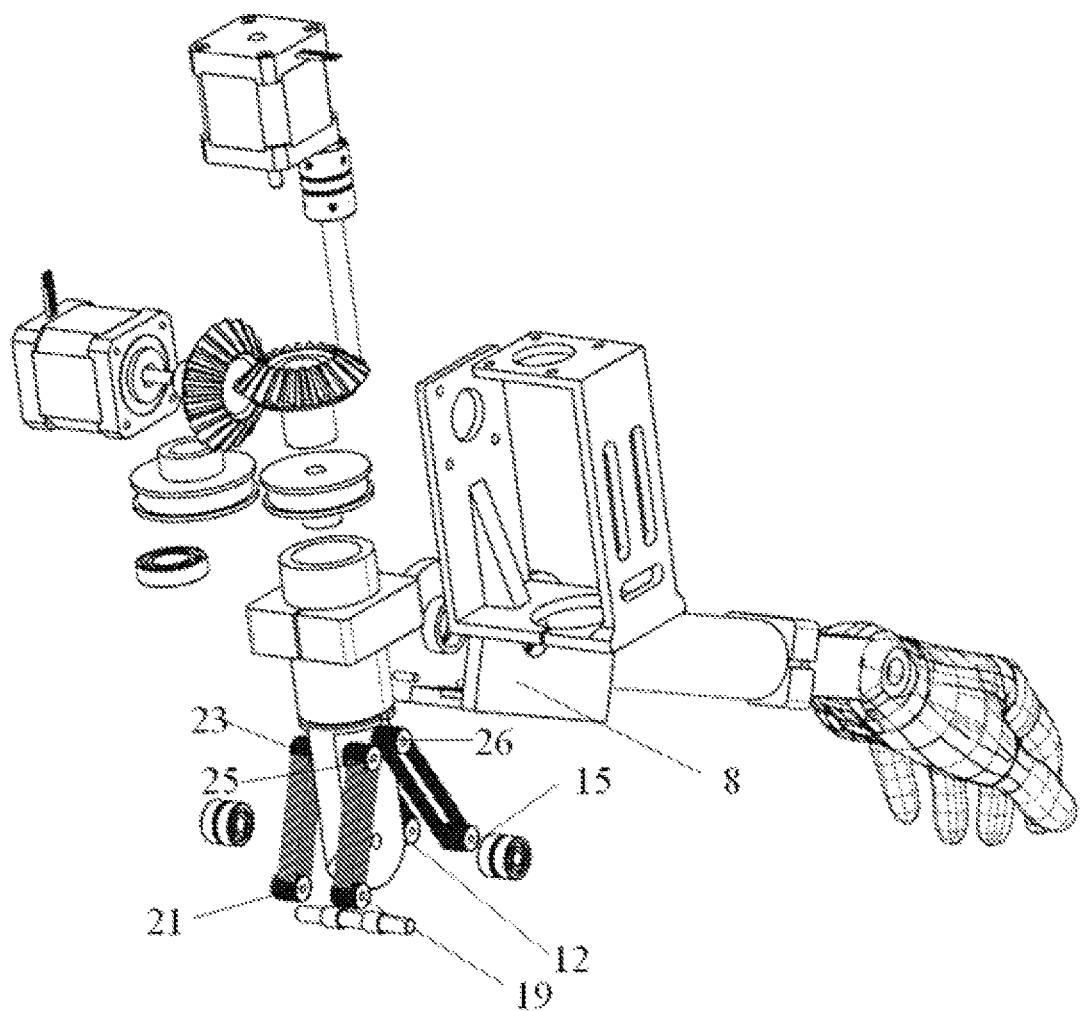
FIG. 2 is a structural exploded view of the arm for a crash dummy according to an embodiment of the present invention.

FIG. 1 and FIG. 2 are structural exploded views of an arm for a crash dummy according to an embodiment of the present invention. With reference to FIG. 1 and FIG. 2, the arm for a crash dummy specifically includes:

a first motor 1, a coupling 2, a capstan shaft 3, a first bevel gear 4, a second motor 5, a first capstan 6, a capstan bearing 7, an elbow joint base 8, a forearm 9, a hand 10, a first elbow joint bearing 11, a first pulley 12, drive lines 13, a second pulley 14, a third pulley 15, an elbow joint shaft 16, a first fixed sleeve 17, a second fixed sleeve 18, a seventh pulley 19, a second elbow joint bearing 20, a fifth pulley 21, an elbow joint connection block 22, a sixth pulley 23, a power source connection block 24, an eighth pulley 25, a fourth pulley 26 (not shown in FIG. 1, but shown in FIG. 2), a second bevel gear 27, a second capstan 28 and a power source bracket 29.

Optionally, the active function of the arm is driven by a means of line driving, and the main action joint is the elbow joint.

Figure 3:
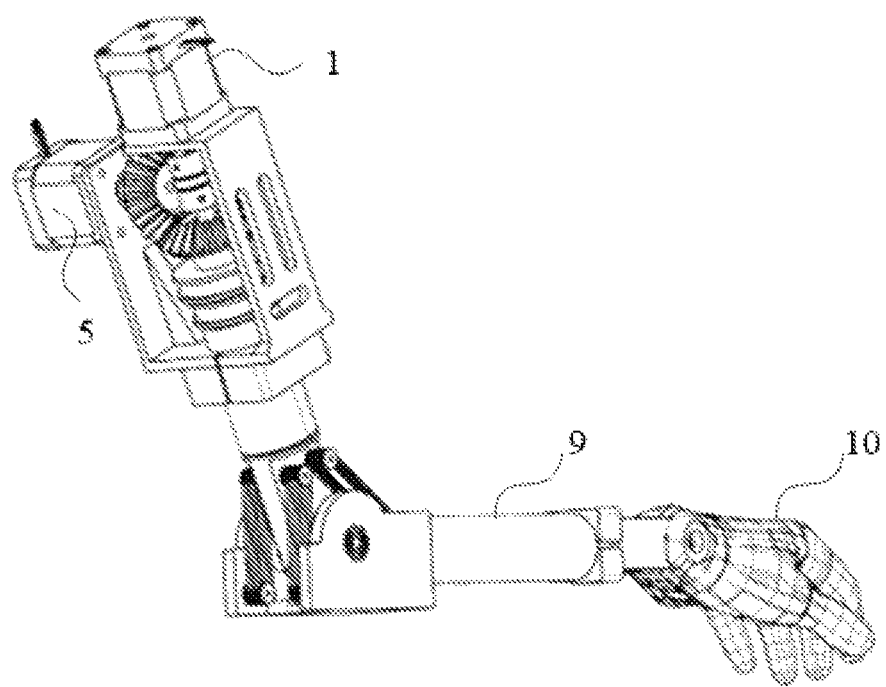
FIG. 3 is a complete structural illustration of the arm for a crash dummy according to an embodiment of the present invention.

Optionally, the first motor 1 and the second motor 5 are arranged at the end of the forearm 9 away from the hand 10, so as to reduce the mass of the arm and improve the movement speed of the arm. Exemplarily, reference may be made to a complete structural illustration of the arm for a crash dummy as shown in FIG. 3, wherein the first motor 1 and the second motor 5 are arranged at the end of the forearm 9 away from the hand 10.

Optionally, the first motor 1 drives the first capstan 6 to rotate through the coupling 2 and the capstan shaft 3; and the second motor 5 drives the second capstan 28 to rotate through the first bevel gear 4 and the second bevel gear 27.

Further, the second capstan 28 and the second bevel gear 27 are of hollow shaft structures; and the capstan shaft 3 passes through the hollow shaft structures of the second capstan 28 and the second bevel gear 27, one end of the capstan shaft 3 is connected to the first capstan 6, and the other end of the capstan shaft 3 is connected to the coupling 2.

The diameter of the first capstan 6 is different from that of the second capstan 28, and the rotation direction of the first capstan 6 is opposite to that of the second capstan 28, for example, the first capstan 6 rotates clockwise and the second capstan 28 rotates counterclockwise. The purpose of this setting is to simultaneously realize the elongation of the drive lines on one side and the shortening of the drive lines on the other side, thereby realizing the movement of the elbow joint in two directions, extension and flexion.

The transmission ratio of the first bevel gear 4 to the second bevel gear 27 is 1:1.

Eight pulleys are installed at the elbow joint, respectively the first pulley 12, the second pulley 14, the third pulley 15, the fourth pulley 26 (not shown in FIG. 1, but shown in FIG. 3), the fifth pulley 21, the sixth pulley 23, the seventh pulley 19 and the eighth pulley 25. The first pulley 12, the second pulley 14, the third pulley 15 and the fourth pulley 26 are divided into the first set of pulleys; and the fifth pulley 21, the sixth pulley 23, the seventh pulley 19 and the eighth pulley 25 are divided into the second set of pulleys. Each pulley is provided with a plurality of drive line clamping grooves. The drive directions of the drive lines of the first set of pulleys and the second set of pulleys are opposite, that is, when the drive lines of one set of pulleys are elongated, the drive lines of the other set of pulleys are shortened, thereby realizing the movement of the elbow joint in two directions, flexion and extension.

The drive lines of the first set of pulleys and the drive lines of the second set of pulleys are respectively arranged on two sides of the elbow joint connection block 22, as shown in FIG. 1 and FIG. 2. Optionally, a plurality of drive lines may be used for driving to improve driving force and stability. Correspondingly, the top of the power source connection block 24 is slotted for routing, and the elbow joint connection block 22 is slotted for routing.

In general, the first pulley 12, the second pulley 14, the third pulley 15 and the fourth pulley 26 are the first set of pulleys; the fifth pulley 21, the sixth pulley 23, the seventh pulley 19 and the eighth pulley 25 are the second set of pulleys; and each of the pulleys is provided with drive line clamping grooves for arranging the drive lines, and the drive direction of the drive lines of the first set of pulleys is opposite to that of the second set of pulleys, so that the drive lines of the second set of pulleys are shortened when the drive lines of the first set of pulleys are elongated, thereby realizing the flexion and extension of the elbow joint. The drive lines of the first set of pulleys and the drive lines of the second set of pulleys are respectively arranged on two sides of the elbow joint connection block 22; and the number of the drive lines arranged in the drive line clamping grooves of each pulley is plural.

Further, the elbow joint shaft 16 is fixedly connected to the elbow joint connection block 22, and is positioned by the first elbow joint bearing 11, the second elbow joint bearing 20, the first fixed sleeve 17 and the second fixed sleeve 18.

Figure 4:
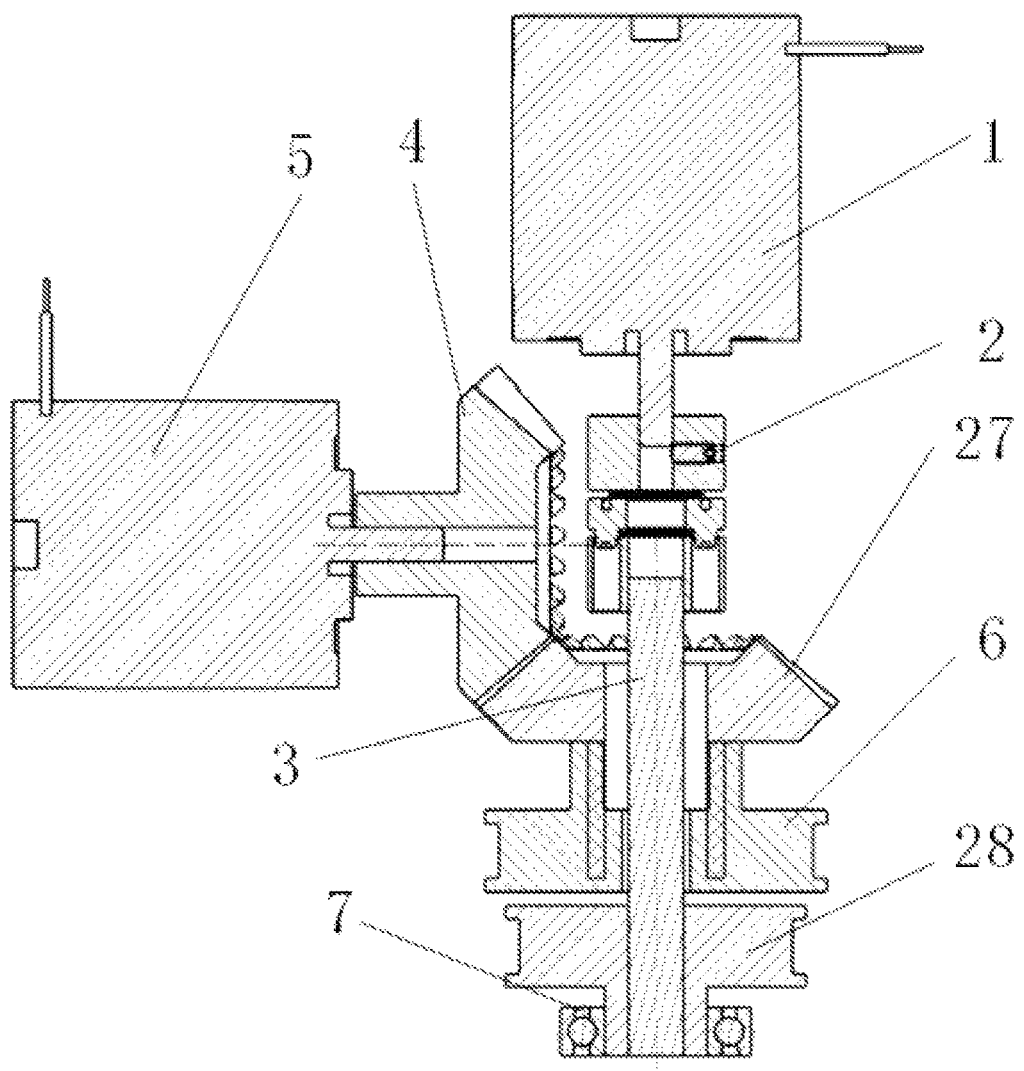
FIG. 4 is a cross-sectional view of a power source according to an embodiment of the present invention.

In a specific embodiment, in conjunction with FIG. 1 and FIG. 2, as well as the cross-sectional view of a power source shown in FIG. 4, the installation process of the above-mentioned arm for a dummy is as follows: the first motor 1 is fixedly connected to one end of the coupling 2 by a jackscrew, and the other end of the coupling 2 is fixedly connected to the capstan shaft 3. The first motor 1 is installed at an installation position on the upper surface of the power source bracket 29. The second motor 5 is installed at an installation position on the side of the power source bracket 29, meanwhile, the motor shaft is fixedly connected to the first bevel gear 4, and the second bevel gear 27 is fixedly connected to the first capstan 6 and engaged with the first bevel gear 4. The second capstan 28 is installed under the first capstan 6 and fixedly connected to the capstan shaft 3, and the second capstan 28 is installed in cooperation with the capstan bearing 7 at the same time. The capstan bearing 7 is installed at the bearing position of the power source connection block 24, the power source connection block 24 is fixedly connected to the elbow joint connection block 22, and the second pulley 14, the fourth pulley 26, the sixth pulley 23 and the eighth pulley 25 are installed at the upper part of the elbow joint connection block 22. The elbow joint connection block 22 is fixedly connected to the elbow joint shaft 16, and the first fixed sleeve 17 and the second fixed sleeve 18 are installed on two sides for positioning. The elbow joint shaft 16 passes through the first elbow joint bearing 11 and the second elbow joint bearing 20. The first elbow joint bearing 11 and the second elbow joint bearing 20 are installed at the bearing positions of the elbow joint base 8. The first pulley 12, the third pulley 15, the fifth pulley 21 and the seventh pulley 19 are installed on the elbow joint base 8, the forearm 9 is fixedly connected to the elbow joint base 8, and the hand 10 is connected to the forearm 9 by bolts. The drive lines are wound and installed in the clamping grooves of each pulley, and are wound on the two capstans (the first capstan 6 and the second capstan 28) through the grooves on the upper surface of the elbow joint connection block 22 and the grooves in the middle of the power source connection block 24.

Further, the arm includes: a control module, the control module including an encoder 30, a memory, a programmable logic controller, and a control program stored inside the memory and processed by the programmable logic controller. The encoder 30 is fixedly connected to the elbow joint shaft 16, and is used to obtain a real-time rotation angle of the elbow joint. The control module further includes an external interaction unit for inputting vehicle preset information, the vehicle preset information is used to determine a target rotation angle of the elbow joint. The specific implementation form of the external interaction unit may be a display device with an input function, a voice receiving and voice recognition device, or a specific gesture recognition device, and the vehicle preset information may be input to the control module by voice or gesture.

The vehicle preset information includes at least one of the following: vehicle crash speed, crash angle and crash mode.

The arm for a crash dummy, provided in this embodiment, has an active function, and can reflect the actual actions of the human arm more really in the event of a crash, so as to reflect the action level of a vehicle passenger protection system and provide a reliable support for the design of vehicle passenger protection systems.

Figure 5:
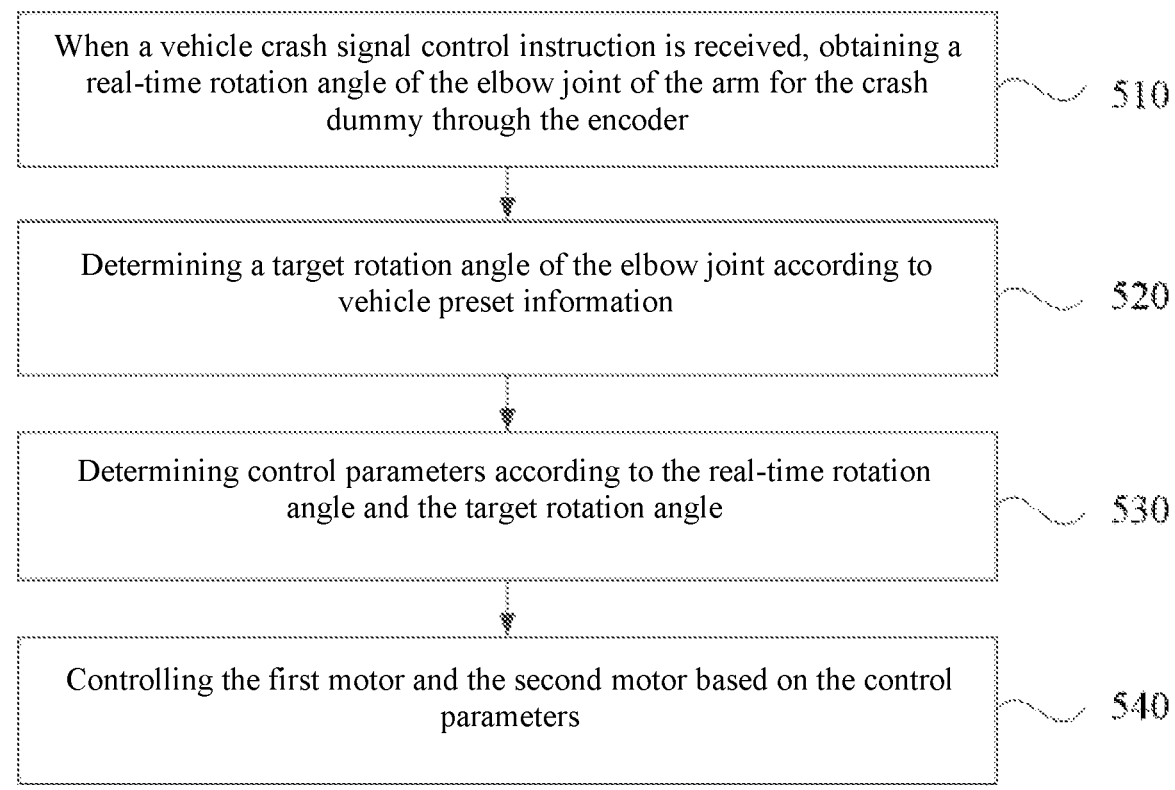
FIG. 5 shows an arm control method for a crash dummy according to an embodiment of the present invention.

Further, on the basis of the above embodiments, an embodiment of the present invention further provides an arm control method for a crash dummy, which is used to control the above-mentioned arm for the crash dummy, so that the arm can simulate relatively real human postures in a vehicle crash test, thereby reflecting the action level of a vehicle passenger protection system, improving the effectiveness of the crash test, and providing a reliable support for the design of vehicle passenger protection systems. As shown in FIG. 5, the arm control method includes the following steps.

Step 510: When a vehicle crash signal control instruction is received, obtaining a real-time rotation angle of the elbow joint of the arm for the crash dummy through the encoder.

The vehicle crash signal control instruction is used to indicate that the crash test has started, and the vehicle crash signal control instruction may be sent by a relevant sensor. Specifically, when the vehicle crashes, the relevant sensor detects a crash signal, and sends the vehicle crash signal control instruction to the programmable logic controller of the control module. When the programmable logic controller receives the vehicle crash signal control instruction, the real-time rotation angle of the elbow joint of the arm for the crash dummy is read from the encoder. That is, the encoder is used to obtain the real-time rotation angle of the elbow joint of the arm for the crash dummy. Optionally, a detection mechanism of the encoder is fixedly connected to the elbow joint shaft. When the elbow joint shaft rotates, the detection mechanism is driven to rotate, and the encoder can directly read the rotation angle.

Step 520: Determining a target rotation angle of the elbow joint according to vehicle preset information.

The vehicle preset information includes at least one of the following: vehicle crash speed, crash angle (e.g., front crash, side crash, etc.) and crash mode (e.g., real vehicle crash, sliding table crash, etc.).

The target rotation angle refers to the angle that the elbow joint needs to be rotated, and this angle is related to the vehicle preset information. For example, when the vehicle crash speed is high, the target rotation angle may be large.

In some embodiments, the relationship between the target rotation angle and the vehicle preset information can be determined by investigation and statistics, or by multiple tests, then the relationship between the target rotation angle and the vehicle preset information is stored, and after the vehicle preset information is obtained, the corresponding target rotation angle can be determined by lookup.

Step 530: Determining control parameters according to the real-time rotation angle and the target rotation angle.

The target rotation angle differs from the real-time rotation angle in that the target rotation angle represents the angle that the elbow joint needs to be rotated under the current crash, and the real-time rotation angle represents the angle of the elbow joint before the crash occurs. For example, if the real-time rotation angle is 10° (relative to the reference position) and the target rotation angle is 20°, the elbow joint needs to be rotated to 30° (relative to the reference position). The control parameters are determined according to the 30°, and the first motor and the second motor are controlled based on the control parameters, so as to change the rotation angle of the elbow joint.

Specifically, the control parameters are variable lengths of the drive lines, and the variable lengths of the drive lines are controlled by the motors to realize the flexion and extension movement of the elbow joint.

Figure 6:
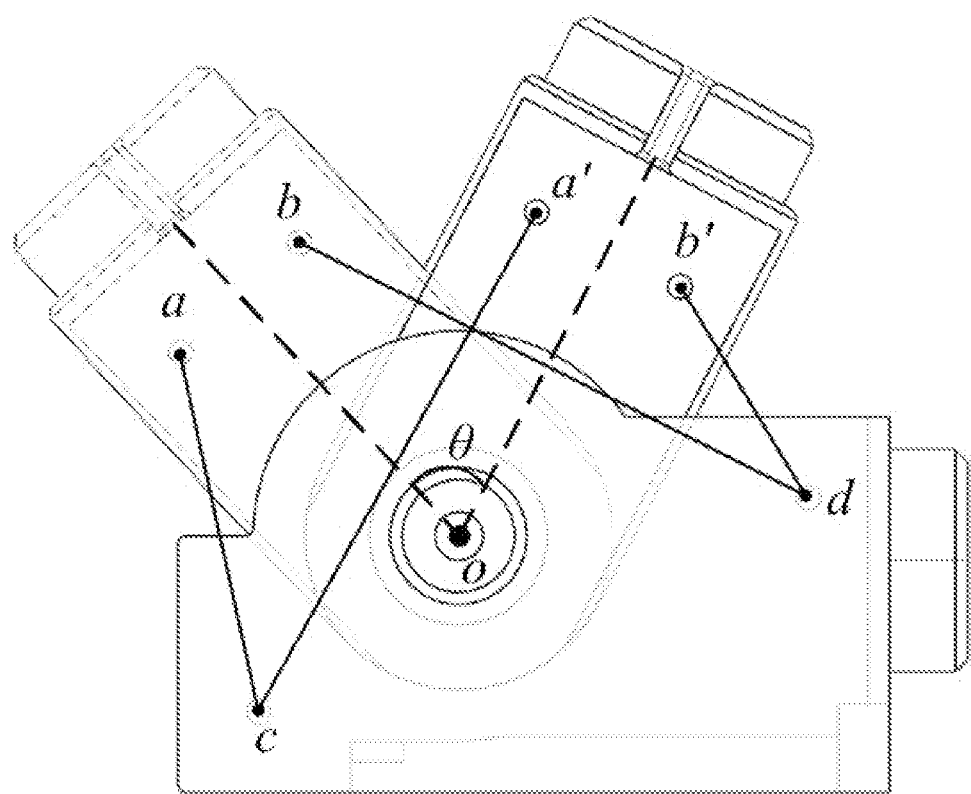
FIG. 6 is a schematic illustration of auxiliary control parameter calculation according to an embodiment of the present invention.

Exemplarily, as shown in FIG. 6, it is assumed that the angle that the elbow joint needs to be rotated is θ, there are N drive line clamping grooves on each pulley, ∠aoc=$α_1$, ∠bod=$α_2$.

The variables $\Delta L_1$ and $\Delta L_2$ of the drive lines of the two sets of pulleys (the first set of pulleys and the second set of pulleys) can be expressed as follows:

$$\Delta L_1 = N \times |\sqrt{|ao|^2+|co|^2-2|ao||co|\cos(\alpha_1)}$$

$$-\sqrt{|a'o|^2+|co|^2-2|a'o||co|\cos(\alpha_1+\theta)}|$$

$$\Delta L_2 = N \times |\sqrt{|bo|^2+|do|^2-2|bo||do|\cos(\alpha_2)}$$

$$\sqrt{|b'o|^2+|do|^2-2|b'o||do|\cos(\alpha_2+\theta)}|$$

Herein, angles $α_1$ and $α_2$ are respectively the angles between two fixed points of the same set of pulleys and a rotation center point, and can be measured by a measuring tool (such as an angle gauge) before the arm crashes and after the initial state is adjusted. The distances |a|, |co|, |ado|, |boo|, |do| and |boo| between two points are constant values after the arm is installed, so the angles can be measured by a measuring tool (such as a vernier caliper) after the arm is installed.

Assuming that the diameters of the first capstan 6 and the second capstan 28 are respectively $D_1$ and $D_2$, the number of turns $r_1$ that the first motor 1 needs to rotate and the number of turns $r_2$ that the second motor 5 needs to rotate are respectively:

$$r_1 = \frac{\Delta L_1}{2\pi D_1}$$

$$r_2 = \frac{\Delta L_2}{2\pi D_2}$$

The number of turns $r_1$ that the first motor 1 needs to rotate and the number of turns $r_2$ that the second motor 5 needs to rotate are transmitted to the programmable logic controller, and the programmable logic controller controls the first motor 1 and the second motor 5, so that the elbow joint of the arm is rotated by the target rotation angle.

Step 540: Controlling the first motor and the second motor based on the control parameters.

According to the arm control method for the crash dummy provided by this embodiment, the target rotation angle is determined based on the vehicle preset information, and then the first motor and the second motor of the arm are controlled, so that the arm can simulate relatively real human postures in a vehicle crash test, thereby reflecting the action level of a vehicle passenger protection system, improving the effectiveness of the crash test, and providing a reliable support for the design of vehicle passenger protection systems.

Figure 7:
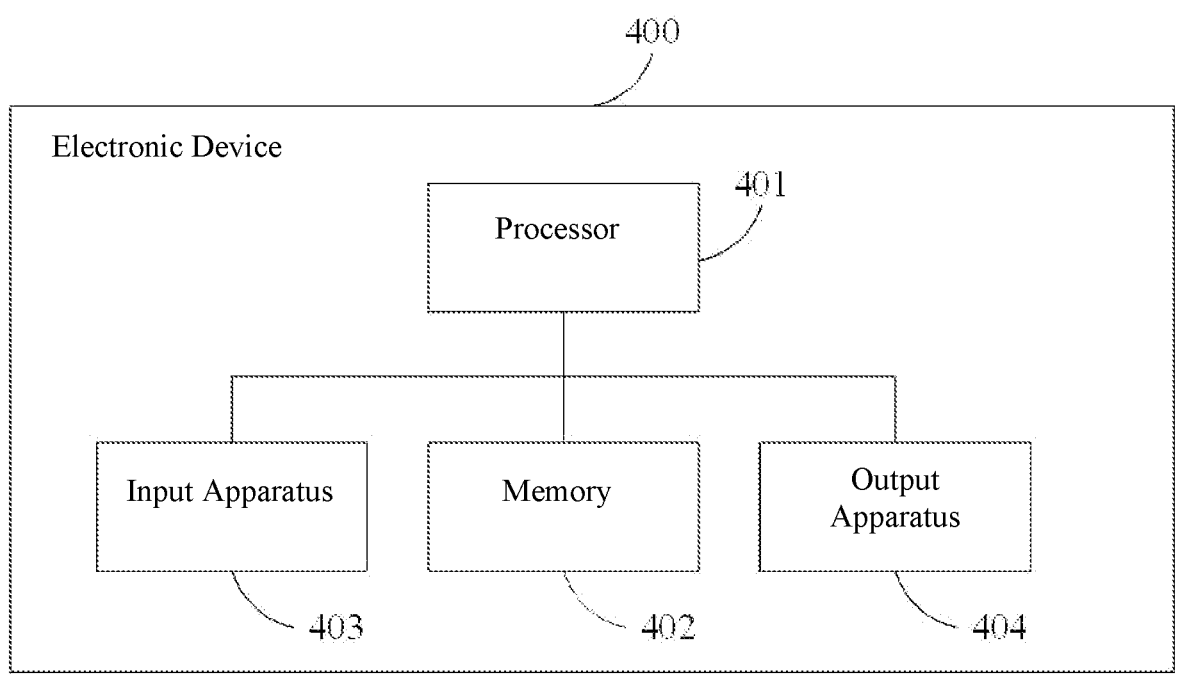
FIG. 7 is a schematic structural illustration of an electronic device according to an embodiment of the present invention.

FIG. 7 is a schematic structural illustration of an electronic device according to an embodiment of the present invention. As shown in FIG. 7, the electronic device 400 includes one or more processors 401 and a memory 402.

The processor 401 may be a central processing unit (CPU) or other forms of processing unit having data processing capability and/or instruction execution capability, and may control other components in the electronic device 400 to execute desired functions.

The memory 402 may include one or more computer program products, which may include various forms of computer-readable storage media, such as a volatile memory and/or a non-volatile memory. The volatile memory may include, for example, a random-access memory (RAM) and/or a cache memory (cache). The non-volatile memory may include, for example, a read-only memory (ROM), a hard disk, a flash memory, etc. One or more computer program instructions may be stored in the computer-readable storage medium, and the processor 401 may run the program instructions to implement the arm control method for a crash dummy according to any embodiment of the present invention described above and/or other desired functions. Various contents such as initial extrinsic parameters and thresholds may also be stored in the computer-readable storage medium.

In one example, the electronic device 400 may further include an input apparatus 403 and an output apparatus 404, and these components are interconnected by a bus system and/or other forms of connection mechanism (not shown). The input apparatus 403 may include, for example, a keyboard, a mouse, etc. The output apparatus 404 may output a variety of information to the outside, including early warning information, braking force, etc. The output apparatus 404 may include, for example, a display, a speaker, a printer, a communication network, a remote output device connected, etc.

Of course, for simplicity, only some of the components in the electronic device 400 related to the present invention are shown in FIG. 7, and components such as buses and input/output interfaces are omitted. Besides, the electronic device 400 may further include any other appropriate components according to the specific application.

In addition to the methods and devices described above, the embodiments of the present invention may also be computer program products including computer program instructions that, when run by a processor, cause the processor to perform the steps of the arm control method for a crash dummy according to any embodiment of the present invention.

The computer program product may be written in one of programming languages or any combination thereof to execute program codes for carrying out operations in the embodiments of the present invention. The programming languages include object-oriented programming languages, such as Java and C++, and also include conventional procedural programming languages, such as "C" language or similar programming languages. The program codes may be completely executed on a user's computing device, partially executed on a user's device, executed as a separate software package, partially executed on a user's computing device and partially executed on a remote computing device, or completely executed on a remote computing device or server.

In addition, the embodiment of the present invention may also be a computer-readable storage medium storing computer program instructions that, when run by a processor, cause the processor to perform the steps of the arm control method for a crash dummy according to any embodiment of the present invention.

The computer-readable storage medium may employ one of readable media or any combination thereof. The readable media may be readable signal media or readable storage media. The readable storage media may include, for example, but are not limited to, electrical, magnetic, optical, electromagnetic, infrared, or semiconductor systems, apparatuses or devices, or any combination of the above. More specific examples (non-exhaustive list) of the readable storage media include: an electrical connection with one or more wires, a portable disk, a hard disk, a random-access memory (RAM), a read-only memory (ROM), an erasable programmable read-only memory (EPROM or flash memory), a fiber, a portable compact disk read-only memory (CD-ROM), an optical memory, a magnetic memory, or any suitable combination of the above.

It should be noted that the terms used in the present invention are only used to describe specific embodiments, rather than limiting the scope of the present application. As shown in the description and claims of the present invention, unless the context clearly dictates otherwise, the words "a", "an", and/or "the" are not intended to specifically refer to the singular and may include the plural. The terms "include", "comprise", or any other variants thereof are intended to cover a non-exclusive inclusion, so that a process, method or device that includes a series of elements not only includes those elements, but also includes other elements not listed explicitly, or includes inherent elements of the process, method or device. In the absence of more limitations, an element defined by "include a . . . " does not exclude other same elements existing in the process, method or device including the element.

It should also be noted that the orientation or position relations indicated by the terms "center", "upper", "lower", "left", "right", "vertical" "horizontal", "inner", "outer", etc. are based on the orientation or position relations shown in the accompanying drawings and are intended to facilitate the description of the present invention and simplify the description only, rather than indicating or implying that the device or element referred to must have a particular orientation or be constructed and operated in a particular orientation, and will not to be interpreted as limiting the present invention. Unless otherwise expressly specified and limited, the terms "installed", "coupled" and "connected" should be generally understood, for example, the "connected" may be fixedly connected, detachably connected, integrally connected, mechanically connected, electrically connected, directly connected, or connected by a medium, or communication between the interiors of two elements. For those of ordinary skill in the art, the specific meanings of the terms descried above in the present invention should be construed according to specific circumstances.

Finally, it should be noted that the above embodiments are only for explaining, but not limiting, the technical solutions of the present invention; although the present invention is described in detail with reference to the foregoing embodiments, those of ordinary skill in the art should understood that the technical solutions described in the foregoing embodiments may be modified, or some or all of the technical features may be equivalently substituted; and such modifications or substitutions do not make the essence of the corresponding technical solutions depart from the technical solutions of the present invention.

What is claimed is:

1. An arm for a crash dummy, comprising:
    a first motor (1), a coupling (2), a capstan shaft (3), a first bevel gear (4), a second motor (5), a first capstan (6), a capstan bearing (7), an elbow joint base (8), a forearm (9), a hand (10), a first elbow joint bearing (11), a first pulley (12), drive lines (13), a second pulley (14), a third pulley (15), an elbow joint shaft (16), a first fixed sleeve (17), a second fixed sleeve (18), a seventh pulley (19), a second elbow joint bearing (20), a fifth pulley (21), an elbow joint connection block (22), a sixth pulley (23), a power source connection block (24), an eighth pulley (25), a fourth pulley (26), a second bevel gear (27), a second capstan (28) and a power source bracket (29);
    wherein the first motor (1) and the second motor (5) are arranged at an end of the forearm (9) away from the hand (10);
    the first motor (1) drives the first capstan (6) to rotate through the coupling (2) and the capstan shaft (3);
    the second motor (5) drives the second capstan (28) to rotate through the first bevel gear (4) and the second bevel gear (27);
    the second capstan (28) and the second bevel gear (27) are of hollow shaft structures;
    the capstan shaft (3) passes through the hollow shaft structures of the second capstan (28) and the second bevel gear (27), one end of the capstan shaft (3) is connected to the first capstan (6), and another end of the capstan shaft (3) is connected to the coupling (2);
    a diameter of the first capstan (6) is different from that of the second capstan (28), and a rotation direction of the first capstan (6) is opposite to that of the second capstan (28);
    a transmission ratio of the first bevel gear (4) to the second bevel gear (27) is 1:1;
    the first pulley (12), the second pulley (14), the third pulley (15) and the fourth pulley (26) are a first set of pulleys;
    the fifth pulley (21), the sixth pulley (23), the seventh pulley (19) and the eighth pulley (25) are a second set of pulleys;
    each of the pulleys is provided with drive line clamping grooves for arranging the drive lines, and a drive direction of the drive lines of the first set of pulleys is opposite to that of the second set of pulleys, so that the drive lines of the second set of pulleys are shortened when the drive lines of the first set of pulleys are elongated, thereby realizing flexion and extension of the elbow joint;
    the drive lines of the first set of pulleys and the drive lines of the second set of pulleys are respectively arranged on two sides of the elbow joint connection block (22); and
    a number of the drive lines arranged in the drive line clamping grooves of each pulley is plural.

2. The arm according to claim 1, wherein the elbow joint shaft (16) is fixedly connected to the elbow joint connection block (22), and is positioned by the first elbow joint bearing (11), the second elbow joint bearing (20), the first fixed sleeve (17) and the second fixed sleeve (18).

3. The arm according to claim 1, further comprising: a control module, wherein the control module comprises an encoder (30), a memory, a programmable logic controller, and a control program stored in the memory and processed by the programmable logic controller;
    the encoder (30) is fixedly connected to the elbow joint shaft (16), and is used to obtain a real-time rotation angle of the elbow joint; and
    the control module further comprises an external interaction unit for inputting vehicle preset information, the vehicle preset information is used to determine a target rotation angle of the elbow joint.

4. The arm according to claim 3, wherein the vehicle preset information comprises at least one of the following: vehicle crash speed, crash angle and crash mode.

5. A method for controlling the arm for the crash dummy according to claim 1, the method comprising:
    when a vehicle crash signal control instruction is received, obtaining a real-time rotation angle of the elbow joint of the arm for the crash dummy through the encoder;
    determining a target rotation angle of the elbow joint according to vehicle preset information;
    determining control parameters according to the real-time rotation angle and the target rotation angle; and
    controlling the first motor and the second motor based on the control parameters.

6. An electronic device, comprising: a processor and a memory, wherein the processor is configured to perform steps of the method according to claim 5 by calling programs or instructions stored in the memory.

7. A non-transitory computer-readable storage medium, wherein the computer-readable storage medium stores programs or instructions that cause a computer to perform steps of the method according to claim 5.

* * * * *